Figure 1:
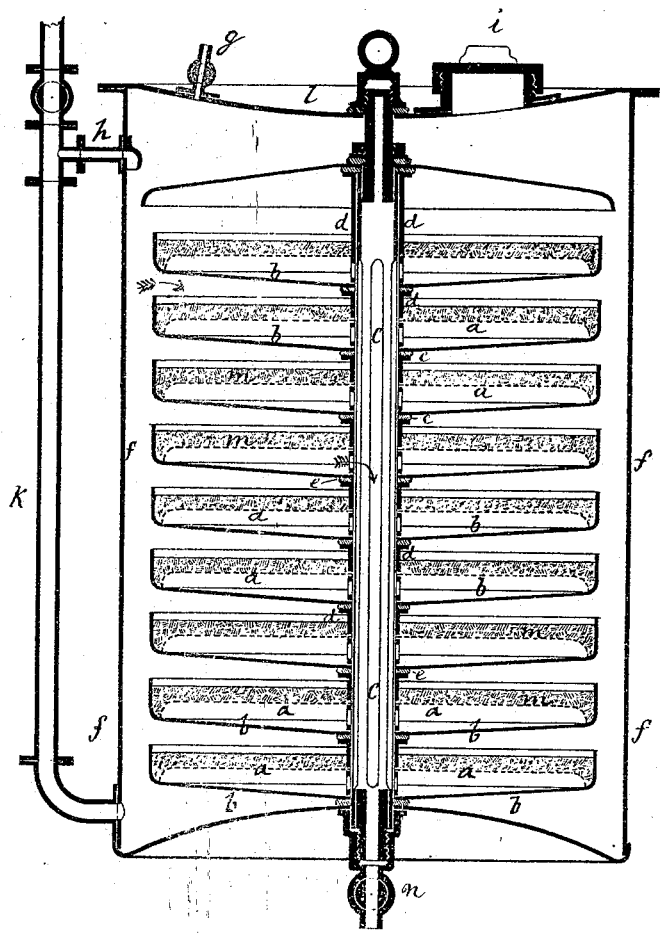

(No Model.) 4 Sheets—Sheet 1.
C. W. E. PIEFKE.
FILTERING APPARATUS.

No. 311,257. Patented Jan. 27, 1885.

WITNESSES:
A. Schehl.
Carl Karp

INVENTOR:
Carl Wilh. Em. Piefke
by Goepel & Raegener
ATTORNEYS.

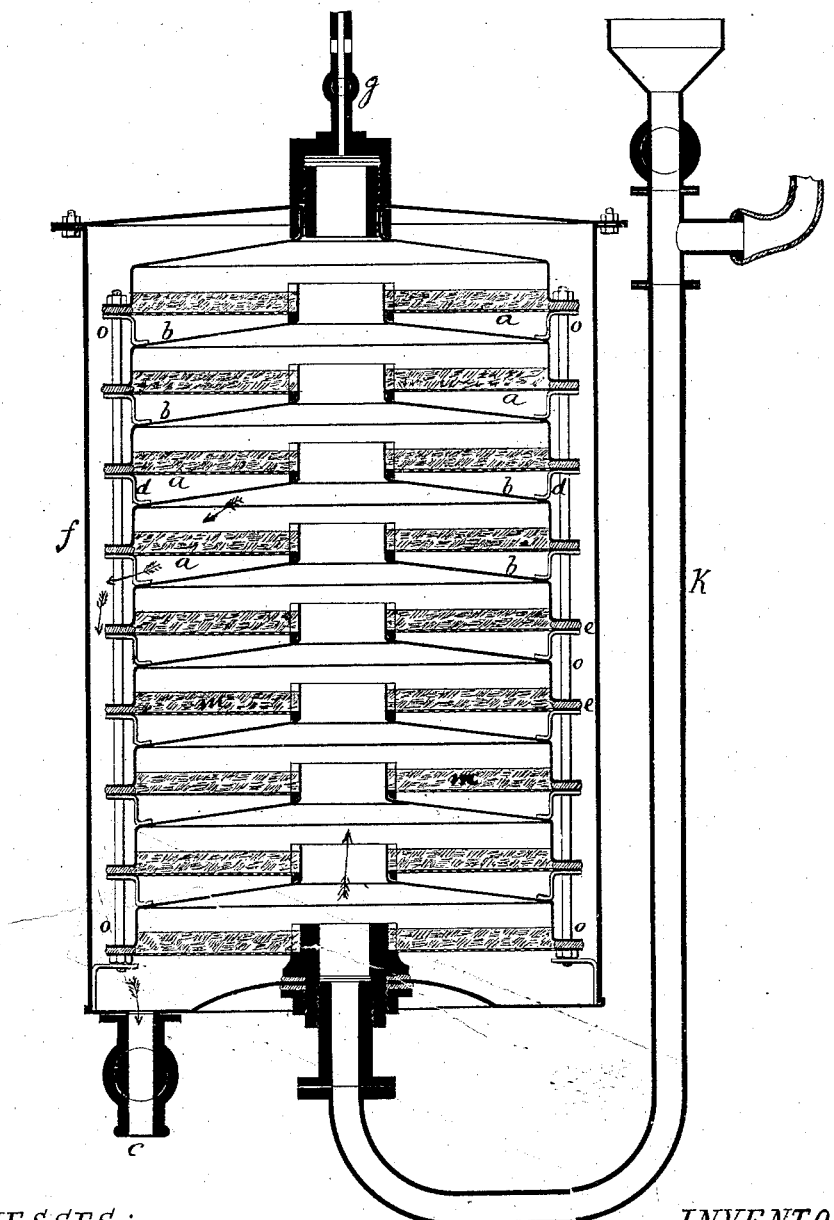

(No Model.) 4 Sheets—Sheet 3.
C. W. E. PIEFKE.
FILTERING APPARATUS.
No. 311,257. Patented Jan. 27, 1885.
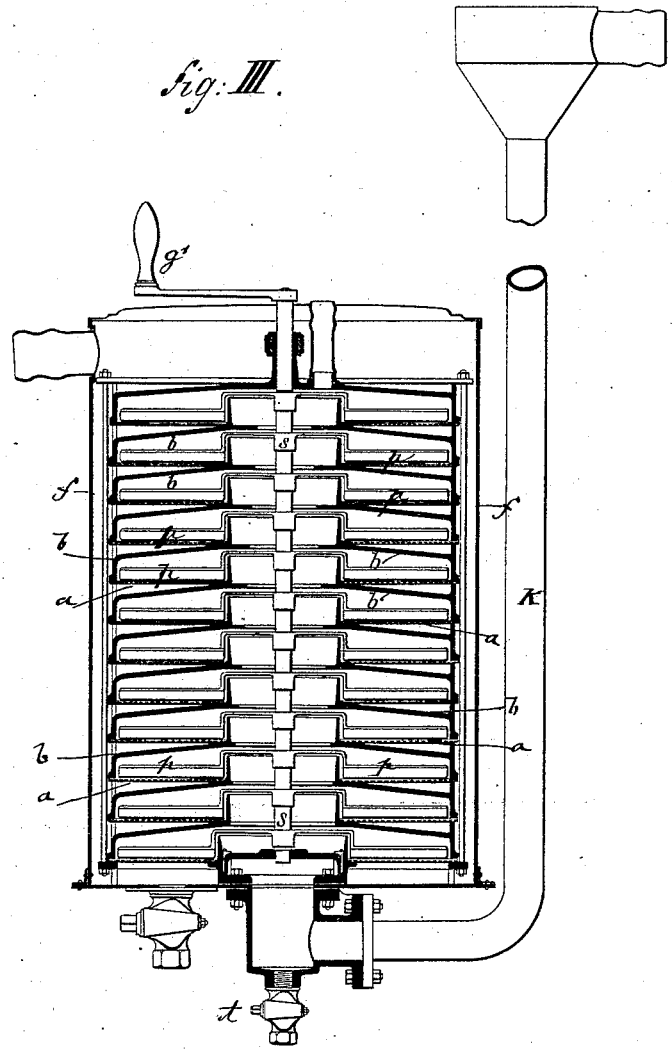
Fig. III.
WITNESSES:
A. Schehl.
Carl Karp
INVENTOR:
Carl Wilh. Em. Piefke
by Goepel & Raegener
ATTORNEYS.

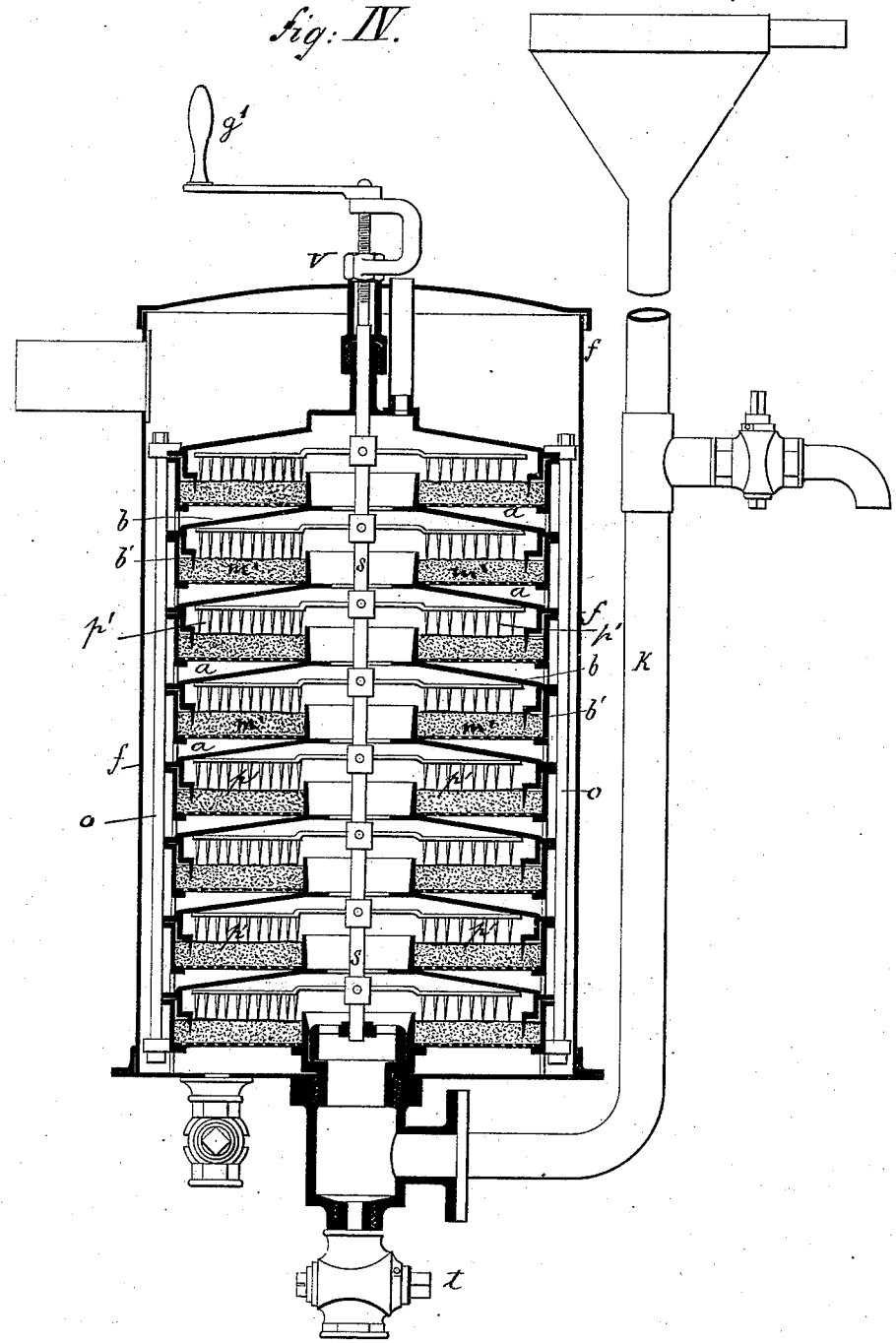

UNITED STATES PATENT OFFICE.

CARL WILHELM EMANUEL PIEFKE, OF BERLIN, GERMANY.

FILTERING APPARATUS.

SPECIFICATION forming part of Letters Patent No. 311,257, dated January 27, 1885.

Application filed December 26, 1883. (No model.) Patented in Germany February 13, 1881, No. 15,741; in England May 14, 1881, No. 2,114; in Belgium May 16, 1881, No. 54,569; in France July 28, 1881, No. 142,835; in Austria January 2, 1882, No. 37,003, and in Italy May 8, 1883, No. 15,399/403.

*To all whom it may concern:*

Be it known that I, CARL WILHELM EMANUEL PIEFKE, of Berlin, in the Kingdom of Prussia and Empire of Germany, have invented certain new and useful Improvements in Filtering Apparatus, (for which Letters Patent have heretofore been granted to me by the governments of the following countries: Germany, dated February 13, 1881, No. 15,741; Great Britain, dated May 14, 1881, No. 2,114; Belgium, dated May 16, 1881, No. 54,569; France, dated July 28, 1881, No. 142,835; Austria, dated January 2, 1882, No. 37,003, and Italy, dated May 8, 1883, No. 15,399/403,) of which the following is a specification.

My invention refers to improvements in filters, by which a large filtering-surface with very thin layers of filtering material is obtained, means being provided for readily cleaning and removing the filtering material.

The invention consists of an exterior receiving-vessel, a series of interior superposed pans, screens supported on said pans, fibrous filtering material deposited on the screens, means by which the liquid to be filtered is conducted to the pans, and means whereby the filtered liquid is drained off. The fibrous material is cleaned from dirt by means of metallic scrapers or stirrers in connection with water that is passed in an opposite direction to that of the liquid through the filtering material.

In the accompanying drawings, Figure I is a vertical central section of my improved filtering apparatus arranged for downward flow; Fig. II, a vertical central section of the same arranged for upward flow; Fig. III, a vertical central section of a modification of the apparatus for upward flow, arranged with scrapers for cleaning; and Fig. IV is a vertical central section of another modification for upward flow, with stirrers for cleaning the filtering material.

Similar letters of reference indicate corresponding parts.

In Fig. I, $a\,a$ represent perforated disks or screens, the outer edges of which are bent downward.

$b\,b$ represent circular pans, into which the screens are placed.

$c$ is a perforated or slotted tube which passes centrally through the pans, and which forms the outlet-channel for the filtered liquid. The lower end of the tube $c$ is provided with a stop-cock, $n$. The pans $b$ and screens $a$ have central holes for the tube $c$, and are secured to the same by short sleeves $d\,d$ and interposed packing-rings $e\,e$, as shown in Fig. I. The tubes $d$ are perforated at their lower ends close to the bottom of the pans $b$, so as to establish a communication for the liquid from the pans to the outlet-tube $c$. The pans $b\,b$ are inclosed by a cylindrical vessel, $f$, to which the liquid to be filtered is supplied by a pipe, $k$, that opens into the vessel $f$ at the lower part of the same. The vessel $f$ has a removable cover, $l$, provided with an air-inlet cock, $g$, and a hand-hole, $i$. The supply-pipe $k$ is also connected with the vessel $f$ near the top of the same by a narrow pipe, $h$, the object of the latter connection being to permit the escape of air or gases from the vessel $f$.

The filtering material $m$ is composed of fine long fibers of cellulose, is first mechanically suspended either in water or in some of the liquid to be filtered, and then introduced either through the hand-hole $i$ or through the supply-pipe and deposited in layers of suitable thickness upon the screens $a$, the thickness of the layers being according to the solutions to be filtered. The liquid is admitted through the supply-pipe $k$ into the receiving-vessel $f$, and rises in the same until it passes gradually over the upper edges of all the pans, and through the filtering material and screens into the space between the screens $a\,a$ and the slightly-inclined bottom of the pans $b$, thence through the outlet-tube $c$ to the outside. The connection of the screens $a$, pans $b$, sleeves $d$, and packing-rings $e$ with the outlet-tube $c$ prevents any direct communication between the vessel $f$, and compels the liquid to pass through the series of filters. When the liquid is filtered at ordinary atmospheric pressure, it is drawn off at the bottom of the vessel $f$; but when the filtering operation is to take place under small pressure, it is better to draw it off at the top. For the purpose the liquid is admitted at the center of the filters and conducted in outward flow through the filters. The apparatus shown in Fig. II is arranged for this purpose, and shows the screens *a a*, supported by brackets or inverted pans *b*. Packing-rings *e e* are interposed between the outer circumference of the screens *a a* and the circumferential flanges of the pans, which latter are held together by bolts *o*. The pans *b b* are provided at the center with tubular portions, that rise above the filtering material deposited on the screens.

The liquid to be filtered may be admitted at the top or at the bottom. When the filters are choked, they have to be cleaned, which is accomplished in the apparatus shown in Figs. I and II by removing the filters and cleaning them by washing.

Figs. III and IV show apparatus for cleaning without removing the filters.

In Fig. III, *s* is a square spindle, that is supported in step and neck bearings at the center of the apparatus. To the spindle are loosely applied radial scrapers *p*, preferably one pair to each screen, which scrapers rest upon the screens. When, after some time the filters cease to operate, water is admitted through a stop-cock at the bottom of the vessel *f* and passed in a counter-current to the filtering liquid through the screens. The spindle *s* is revolved by turning the crank *g'*, thereby causing the scrapers *p* to agitate the filtering material and wash it by the action of the water. The dirt is thus removed and passed with the water through the screens to the bottom of the vessel, where it is drawn off through the stop-cock *t* at the bottom. A small quantity of the filtering material is carried off therewith, and has to be renewed, which is done in the manner described for depositing the filtering material.

Fig. IV shows an arrangement similar to that shown in Fig. III. In this apparatus, however, the filtering material is not deposited directly upon the screens but upon a foundation layer of sand, *m'*, or other suitable granular material. The inverted pans *b b* are in this case formed of two parts, *b* and *b'*, the lower ring-shaped part, *b'*, resting upon the screen *a*, and forming, with the screen, a receptacle for the sand or other granular material. The outer edges of the upper parts, *b*, project down into the sand, thus compelling the liquid to take the course through the filtering material without the necessity of using rubber packing, as in the other cases. The filtering material is introduced through the top of the vessel *f*, and is uniformly deposited upon the granular material. When dirt has accumulated and prevents the passage of the liquid through the filtering material, the comb-shaped stirrers *p'* (shown in Fig. IV) are brought into operation. These stirrers are similar in construction and action to the scrapers above described, and shown in Fig. III, with the exception that the arms of the former are firmly attached to the spindle S, which is adjustable in a vertical direction by means of the nut V, and that the arms have teeth projecting into the filtering material and sand. When the spindle is revolved and water admitted at the bottom, the teeth stir up the sand and dirt, and the water carries off the dirt and filtering material through the bottom stop-cock, *u*. The filtering material carried off may be gathered, washed, and used over again; but it has to be washed with soda if the filtered material contained fats. The filtering material has to be renewed after each cleaning; but when sand is used but an exceedingly thin film or layer is required. The granular foundation remains after cleaning if the proper care has been used, and the spindle with its stirrers can be adjusted for variations in the depth of the layers.

Having thus described my invention, I desire to secure by Letters Patent—

1. The combination, in a filtering apparatus, of a receiving-vessel, a series of superposed pans within said vessel, screens supported on said pans, the pans and screens being smaller in diameter than said vessel, whereby an annular space is formed between them and the inner circumference thereof, layers of filtering material upon said pans, and a central tube passing through said pans and screens and provided with open perforations or slots opposite the pans, substantially as described.

2. The combination, in a filtering apparatus, of a receiving-vessel, a series of superposed pans within said vessel, screens supported on said pans, layers of filtering material upon said pans, a central tube passing through said pans and screens, and provided with perforations or slots opposite the pans, and rotary stirrers arranged over the screens, substantially as described.

3. The combination, in a filtering apparatus, of a receiving-vessel, a series of superposed pans within said vessel, screens supported on said pans, layers of filtering material on said screens, composed of sand and fibrous material, rotary stirring-arms over said screens, provided with teeth, and a central tube passing through said pans and screens, and provided with perforations or slots opposite the pans, substantially as described.

In testimony that I claim the foregoing as my own invention, I have hereunto affixed my signature in presence of two witnesses.

CARL WILHELM EMANUEL PIEFKE.

Witnesses:
M. S. BREWER,
RUDOLF GOTTLIEB OTTO ZORN.